(12) United States Patent
Holur et al.

(10) Patent No.: US 7,526,297 B1
(45) Date of Patent: Apr. 28, 2009

(54) METHOD AND SYSTEM FOR MANAGING PUSHED DATA AT A MOBILE UNIT

(75) Inventors: Balaji S. Holur, Plano, TX (US); Charles J. Derrick, Plano, TX (US); Kenneth W. Davidson, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 618 days.

(21) Appl. No.: 10/004,320

(22) Filed: Oct. 30, 2001

(51) Int. Cl.
*H04H 1/00* (2006.01)

(52) U.S. Cl. .................. 455/466; 455/445; 455/517; 340/7.48; 370/310; 709/219; 709/224

(58) Field of Classification Search ............ 455/466, 455/412.1, 445, 426.1, 517; 370/331, 338, 370/349, 310; 709/219, 224; 340/7.48
See application file for complete search history.

(56) References Cited

U.S. PATENT DOCUMENTS

| | | | |
|---|---|---|---|
| 5,586,121 A | 12/1996 | Moura et al. | 370/404 |
| 5,610,910 A | 3/1997 | Focsaneanu et al. | 370/351 |
| 5,705,995 A * | 1/1998 | Laflin et al. | 340/7.48 |
| 5,818,845 A | 10/1998 | Moura et al. | 370/449 |
| 5,828,666 A | 10/1998 | Focsaneanu et al. | 370/389 |
| 5,991,292 A | 11/1999 | Focsaneanu et al. | 370/352 |
| 6,005,580 A | 12/1999 | Donovan | 345/428 |
| 6,075,792 A | 6/2000 | Ozluturk | 370/441 |
| 6,115,370 A | 9/2000 | Struhsaker et al. | 370/342 |
| 6,119,014 A * | 9/2000 | Alperovich et al. | 455/466 |
| 6,327,254 B1 | 12/2001 | Chuah | 370/328 |
| 6,452,942 B1 | 9/2002 | Lemieux | 370/468 |
| 6,665,537 B1 | 12/2003 | Lioy | 455/435 |
| 6,708,206 B1 * | 3/2004 | Thrane et al. | 709/219 |
| 6,947,396 B1 * | 9/2005 | Salmi | 370/310 |
| 7,107,341 B2 * | 9/2006 | Mousseau et al. | 709/224 |
| 7,136,920 B2 * | 11/2006 | Castell et al. | 709/224 |
| 7,356,591 B2 * | 4/2008 | Mousseau et al. | 709/224 |
| 2001/0041571 A1 * | 11/2001 | Yuan | 455/445 |
| 2002/0187794 A1 * | 12/2002 | Fostick et al. | 455/466 |
| 2003/0109272 A1 * | 6/2003 | Mousseau et al. | 455/517 |
| 2004/0048627 A1 * | 3/2004 | Olvera-Hernandez | 455/466 |
| 2006/0271679 A1 * | 11/2006 | Mousseau et al. | 709/224 |

OTHER PUBLICATIONS

Holur, et al., U.S. Appl. No. 09/908,348, filed Jul. 18, 2001, *Method and System for Managing Wireless Bandwidth Resource*, 59 pages of Specification, Claims and Abstract and 7 pages of drawings, Jul. 18, 2001.

(Continued)

*Primary Examiner*—William D Cumming
(74) *Attorney, Agent, or Firm*—Baker Botts L.L.P.

(57) ABSTRACT

A method and system for managing pushed data at a mobile unit include the capability to receive an out-of-band message at a mobile unit and analyze the message to determine if it contains pushed data. The method and system also include the capability to determine, if the message contains pushed data, whether the data is appropriate for a session currently being hosted by the mobile unit. The method and system further include the capability to post the data to the session if the data is appropriate for the session.

33 Claims, 6 Drawing Sheets

OTHER PUBLICATIONS

Holur, et al., U.S. Appl. No. 09/771,257, filed Jan. 26, 2001, *Method and System for Providing Service Trigger Management in a Wireless Network*. 45 pages of Specification, Claims and Abstract and 6 pages of drawings, Jan. 26, 2001.

Holur, et al., U.S. Appl. No. 09/771,205, filed Jan. 26, 2001, *Method and System for Label Edge Routing in a Wireless Network*, 48 pages of Specification, Claims and Abstract and 9 pages of drawings, Jan. 26, 2001.

TR45, cdma2000 Wireless IP Network Standard, TIA/EIA/IS-835-B, 1-page cover, 8 pages Table of Contents, Figures, Tables and Revision History, and 98 pages of text, Sep. 2002.

Mobile Wireless Internet Forum (mwif), "*Network Reference Architecture Technical Report MTR-004*", Release 2.0, Contribution Reference No. MWIF 2001.053.3, 95 pages, Jun. 13, 2003.

Mobile Wireless Internet Forum (mwif), *OpenRAN Architecture in 3rd Generation Mobile Systems*, Technical Report MTR-007, Release v1.0.0, 64 pages, Sep. 4, 2001.

3GPP TS 22.101 6.4.0, *3rd Generation Partnership Project; Technical Specification Group Services and System Aspects Service aspects; Service principles*, Release 6, 45 pages, Jun. 2003.

Xerox PARC, RFC 1256, "*ICMP Router Discovery Messages*", 18 pages, Sep. 1991.

Wu, et al, RFC 3270, "*Multi-Protocol Label Switching (MPLS) Support of Differentiated Services*", 57 pages, May 2002.

IBM, RFC 2002, "*IP Mobility Support*", 71 pages, Oct. 1996.

std005, RFC 791, "*Internet Protocol*", DARPA Internet Program Protocol Specification, 115 pages, Sep. 1981.

J. Boyle, et al, IPHighway, RFC 2749, "*COPS Usage for RSVP*", 16 pages, Jan. 2000.

S. Herzog, IPHighway, RFC 2750, "*RSVP Extensions for Policy Control*", 13 pages, Jan. 2000.

Xerox PARC, RFC 2236, "*Internet Group Management Protocol, Version 2*", 23 pages, Nov. 1997.

J. Boyle, et al, "*The COPS (Common Open Policy Service) Protocol*", RFC 2748, 36 pages, Jan. 2000.

3GPP Specifications—Numbering Scheme, http://www.3gpp.org/specs/numbering.htm, 2 pages, May 7, 2003.

* cited by examiner

METHOD AND SYSTEM FOR MANAGING PUSHED DATA AT A MOBILE UNIT

TECHNICAL FIELD OF THE INVENTION

This invention relates generally to the field of wireless communications and, more particularly, to a method and system for managing data sent to a mobile unit.

BACKGROUND OF THE INVENTION

Modern communication systems allow individuals to stay in communication as they move about. The most notable device for this is the cellular telephone, which allows people to communicate verbally with each other. There is, however, a whole other range of communications that people use in their daily lives that are not as well developed for mobile use—the sending and receiving of information, such as, for example, over the Internet.

To address this need, modern communication systems include wireless devices that are capable of initiating network sessions through serving nodes that couple the wireless devices to a network. The wireless devices may then receive data, such as stock quotes, advertisements, and/or e-mails, from various service providers.

In existing networks, unfortunately, when a service provider desires to send data to a mobile node, the service provider must send the data through a protocol gateway where the transport layer of the mobile node is terminating. Accordingly, all of the service providers that are trying to send data to the mobile node need to know the addresses of the mobile node and the protocol gateway where the transport layer is terminating. This results in extensive network wide messaging to understand where the mobile node is, which uses the resources of several system wide logical resources and messaging between numerous network elements. Additionally, this results in processing considerations at the serving node, because it must monitor what type of data is being sent to the mobile node.

SUMMARY OF THE INVENTION

The present invention provides a method and system for managing pushed data at a mobile unit. In particular embodiments, the pushed data arrives at the mobile unit in out-of-band messages, which decreases processing resources required to identify the pushed data and allows the mobile unit to manage the pushed data.

In some embodiments, a method for managing pushed data at a mobile unit includes receiving an out-of-band message at a mobile unit and analyzing the message to determine if it contains pushed data. The method also includes determining, if the message contains pushed data, whether the data is appropriate for a session currently being hosted by the mobile unit and posting the data to the session if the data is appropriate for the session.

In particular embodiments, a system for managing pushed data at a mobile unit includes a computer-processable medium and logic stored on the computer-processable medium. The logic is operable to receive an out-of-band message at a mobile unit and to analyze the message to determine if it contains pushed data. The logic is further operable to determine, if the message contains pushed data, whether the data is appropriate for a session currently being hosted by the mobile unit and to post the data to the session if the data is appropriate for the session.

The present invention provides several technical features. In particular embodiments, out-of-band messages are communicated between a wireless device and an agent in the serving node when the wireless device is attempting to initiate a network session. Accordingly, the burden on the resources of the serving node with regard to verifying session activity is greatly reduced, freeing those resources to accomplish other tasks. Furthermore, the traffic and the signaling messages do not need to be mixed.

Other technical features include distributing intelligence about network sessions across the wireless infrastructure and the wireless devices. This reduces processing power required by the wireless infrastructure, which reduces costs for the operator. The intelligence distribution also provides increased flexibility in terms of service management, and allows a user more flexibility in selecting services. As a result, the service provider may obtain increased revenues, while the user may select services in real-time and inform the wireless infrastructure of actions and conditions for the newly selected services.

Additional technical features include the ability for the service provider to dynamically set traffic characteristics for the data services in a session. Thus, if a new data service is to be added and insufficient bandwidth exists, the service provider may, consistent with quality of service provisions, degrade the quality of the service or of another data service. Accordingly, this allows a better utilization of resources.

Additionally, the serving node does not have to communicate with the protocol gateway to push data to the mobile node. This allows the packets carrying the data to be smaller, which reduces message traffic in the network.

In certain embodiments, the invention allows pushed data to be sent to a mobile unit through out-of-band messages. Accordingly, the burden on the processing resources of a serving node servicing the mobile unit are reduced because the serving node does not have to inspect all of the incoming data for pushed data. Furthermore, by sending the pushed data in out-of-band messages, the mobile unit may manage the posting of the pushed data to the packet data sessions. This also has the effect of reducing the burden on processing resources at the serving node. Furthermore, by allowing the mobile node to handle the management of the pushed data, requests in response to the pushed data may be analyzed by the mobile unit to determine whether sufficient bandwidth is available for the response and, if not, the mobile unit may negotiate for additional bandwidth.

Other technical features will be readily apparent to those skilled in the art from the following figures, description, and claims. Of course, certain embodiments may possess none, one, some, or all of these technical features.

BRIEF DESCRIPTION OF THE DRAWINGS

The drawings described below provide a better understanding of the present invention, especially when considered with the following written description, and of its technical features.

DETAILED DESCRIPTION OF THE INVENTION

Figure 1:
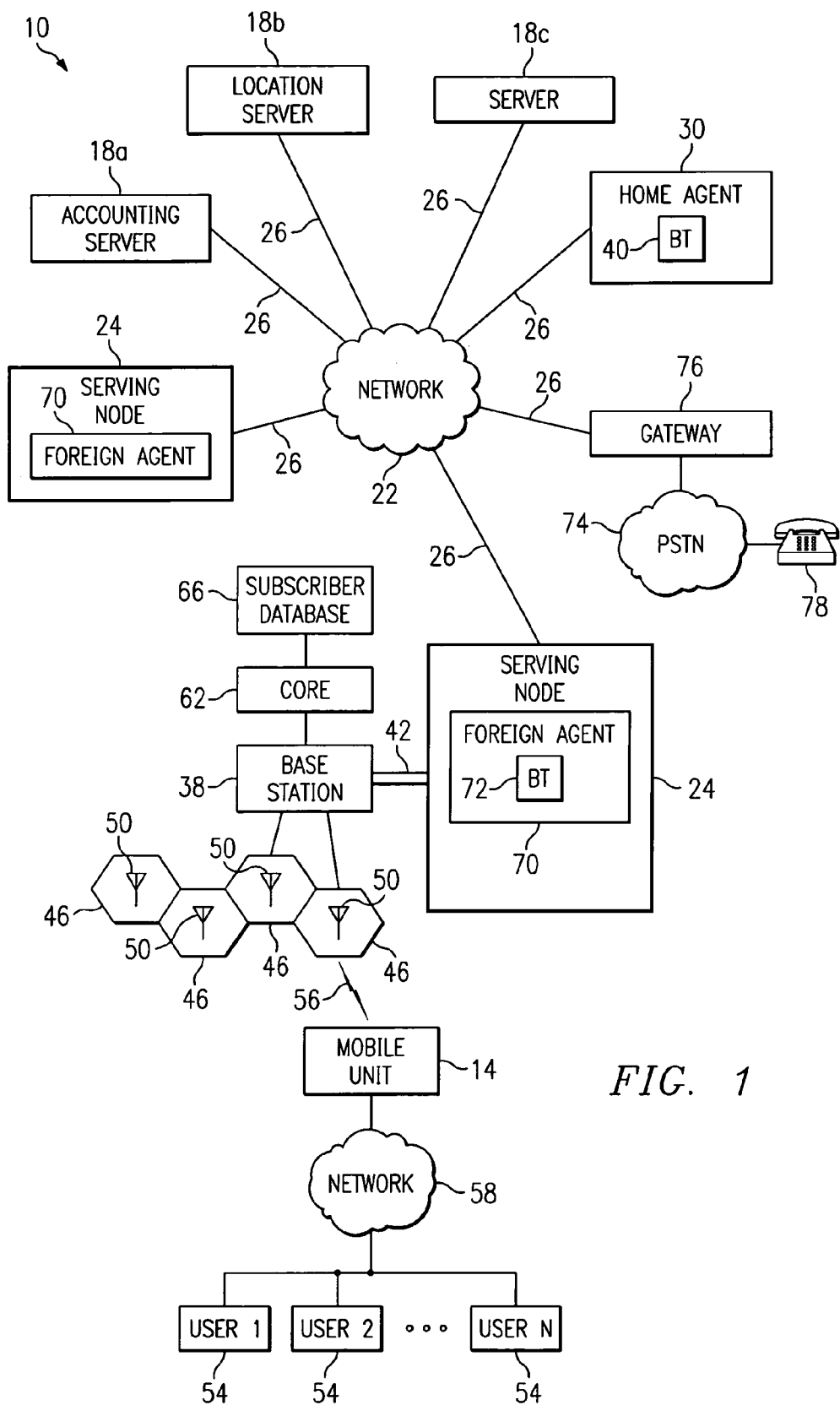
FIG. 1 is a block diagram illustrating a communications system in accordance with one embodiment of the present invention.

FIG. 1 is a block diagram illustrating a communications system 10 in accordance with one embodiment of the present invention. Communications system 10 may transmit voice, audio, video, text, and/or other types of data from one point to another. Communications system 10 includes a mobile unit 14 and a plurality of servers 18 between which data may be exchanged.

Mobile unit 14 may be a wireless telephone, a wireless interface terminal, or other suitable mobile device operable to provide wireless communication in communications system 10. Servers 18 include an accounting server 18a, a location server 18b, and/or any other suitable server 18c for providing services in the communications system 10. Accounting server 18a allows reconciliation between different systems, and location server 18b facilitates location of the mobile unit 14 and advertising to application based servers. In general, system 10 may have any number and/or type of servers.

Mobile unit 14 and servers 18 are coupled to one another and communicate through a network 22, in addition to a wireless infrastructure and a serving node 24. Network 22 may provide this communication over a plurality of communication links 26. Network 22 may be any interconnection found on any computer network such as a wide area network, the Internet, or any other communications and data exchange systems created by connecting two or more computers.

Communication links 26 may be any type of communication link capable of supporting data transfer. In one embodiment, communication links 26 may be, alone or in combination, Integrated Services Digital Network (ISDN) links, Asymmetric Digital Subscriber Line (ADSL) links, T1 or T3 communication lines, hard-wire lines, telephone lines, Synchronous Optical Network (SONET) links, or wireless communication links. It will be understood that communication links 26 may be other suitable types of data communication links. Communication links 26 may also connect to a plurality of intermediate servers between the network 22 and the mobile unit 14 and the servers 18.

Communications system 10 also includes at least one home agent 30 for mobile unit 14, a packet data serving node 24, and a base station 38. Home agent 30 includes a binding table 40 that stores data relating to the mobile unit 14, as described in more detail below. Serving node 24 is coupled to base station 38 through a plurality of radio packet (RP) data switch node links 42 or other suitable links. Each RP link 42 provides a logical path for a mobile unit packet session between the base station 38 and the serving node 24. Serving node 24 may be any type of device that can receive packets for mobile unit 14 from a data network such as network 22 and forward them toward mobile unit 14.

Base station 38 is operable to provide communication for mobile unit 14 within each of a plurality of cells 46 for that base station 38. As used herein, "each" means every one of at least a subset of the identified items. The mobile unit 14 is operable to communicate with the base station 38 through a transceiver 50 in each cell 46 over a radio frequency (RF) link 56 or other suitable wireless link.

According to one embodiment, the link 56 is an RF link that is based on established technology, such as IS-95 (CDMA), W-CDMA, or CDMA-2000. In a particular embodiment, the link 56 is a code division multiple access (CDMA) link based on a CDMA standard and in which packets are segmented into frames for wireless transmission from the mobile unit 14 to the base station 38 where the frames are re-assembled to reconstitute the packets.

According to the embodiment illustrated in FIG. 1, the mobile unit 14 includes a wireless interface terminal that is operable to host a plurality of users 54. The mobile unit 14 and the users 54 are coupled to one another and communicate through a network 58. Network 58 may itself be a wireless or any other interconnection found on any computer network such as a local area network, a wide area network, the Internet, or any other communications and data exchange systems created by connecting two or more computers.

The system 10 also includes a core control network 62 coupled to the base station 38 and a subscriber database 66 coupled to the core 62. The core 62 is operable to perform authentication and to set up and disconnect calls for mobile units in cells 46 of the base station 38. The core 62 is also operable to store service level agreements for each user 54 and to provide the agreements to the serving node 24 for service management, traffic management, or other appropriate operations. The core 62 may include a mobile switching center (MSC) that is operable to provide, in conjunction with the base station 38, switch and soft hand-off functionality for the system 10. In this way, voice, video, audio, text and/or other data is routed to and from the mobile unit 14 and connections are maintained with the mobile unit 14 as it moves between cells 46 and between base stations. It will be recognized that system 10 may have multiple base stations serviced by serving node 24, and, furthermore, multiple serving nodes serving multiple base stations. Thus, mobile unit 14 may travel throughout a wide geographic area. Additionally, system 10 may have multiple mobile units such as mobile unit 10 communicating with various devices in the system. The subscriber database 66 stores information relating to mobile unit 14 and/or users 54, such as name, address, account number, account type, and any other suitable information.

Serving node 24 includes a foreign agent 70 that provides communication, through the network 22, between mobile unit 14 and an endpoint. The endpoint may comprise another mobile unit, a standard telephone, a server, or other suitable device. The foreign agent 70 provides functionality similar to the home agent 30 when the mobile unit 14 is out of range for communicating with the home agent 30. The foreign agent 70 includes a binding table 72 that is operable to store data relating to the mobile unit 14. The serving node may be a packet data serving node (PDSN).

According to one embodiment, for each mobile unit corresponding to the home agent 30, the binding table 40 includes a mobile unit identifier, a care of address (COA) for the current foreign agent, the internet protocol (IP) address or addresses assigned to the mobile unit, other mobile binding information, and/or any other suitable tunneling characteristics. Similarly, for each mobile unit corresponding to the foreign agent 70, the binding table 72 includes a mobile unit identifier, an address for the home agent, the IP address or addresses assigned to the mobile unit, other binding mobile information, and/or any other suitable tunneling characteristics.

Mobile unit 14 and serving node 24 may communicate data and associated addressing information by in-band and/or out-of-band messaging. As used herein, "out-of-band" means communication of data that may be retrieved without inspecting the contents of the payload data of in-band messages. Thus, out-of-band communication provides a mechanism for communicating data in order to implement functions that may be undefined at the time the in-band messaging parameters are determined.

As described in more detail below in connection with FIGS. 2A-C, agent discovery messages, such as agent advertisement messages (AAMs) and agent solicitation messages (ASMs), allow out-of-band communication that enables the mobile unit 14 to determine whether the mobile unit 14 is in communication with its home agent 30 or a foreign agent 70, to determine whether the mobile unit 14 has roamed from one foreign agent 70 to another foreign agent 70, to obtain a COA when in communication with a foreign agent 70, to assist the serving node 24 with service management, to manage bandwidth resources of the wireless link 56, to receive pushed data, and/or to provide or obtain any other suitable information.

In addition to being operable to provide communication for mobile units having the ability to communicate out-of-band messages, the serving node 24 is also operable to provide communication for mobile units that are incapable of communicating using out-of-band messages. Thus, for example, while establishing a connection for a mobile unit, the serving node 24 may identify the connection as out-of-band incapable or as out-of-band capable. In this way, the system 10 may support network communication for various types of mobile units.

The network 22 connects a number of servers 18 to each other and to the serving node 24. The network 22 also connects the serving node 24, and thus the mobile unit 14, to the public switched telephone network (PSTN) 74 through a gateway 76. Accordingly, the mobile unit 14 may communicate through serving node 24, the network 22 and the PSTN 74 with standard telephones, clients and computers using modems or digital subscriber line (DSL) connections or other telephony devices 78.

In operation of particular embodiments, when a mobile unit desires a data service, which is usually triggered by the starting of an application at an associated user or at the mobile unit itself, a session is initiated between the mobile unit, the base station, and the serving node. Initiating a session may involve allocating radio resources, establishing an RP session between the base station and the serving node, establishing a data link session between the mobile unit and the serving node, and/or allocating an IP address to the mobile unit. Once the data link is established, the mobile unit may use an out-of-band message, such as an ASM, to send information about the desired service to the serving node. The information about the service could include the type of service, class of service, and/or data rate and may be sent in the vendor-specific extension of the ASM. The agent in the serving node extracts the traffic information and updates the traffic information database for the session.

The agent, along with the traffic management system, then checks whether the requested traffic characteristics are within the bounds of the service level agreement for the mobile unit. If the request is valid, the serving node sends a request through the RP interface to the base station to determine whether the RF resources are available to support the requested traffic characteristics. The base station may check the forward power, available logical resources, currently utilized bandwidth, and/or other factors to decide whether to allocate the requested bandwidth. The base station then uses the RP interface to send an acknowledgement to the serving node. Based on the result received from the base station, the serving node updates the traffic information and sends the result to the mobile unit through an out-of-band message, such as the vendor-extension in an AAM.

When mobile unit 14 is outside the range of its home agent 30 such that communication with the network 22 is provided by foreign agent 70, the serving node 24 recognizes that mobile unit 14 is communicating with a transceiver 50 in one of cells 46 for the base station 38 corresponding to the serving node 24. Based on this recognition, the foreign agent 70 for the serving node 24 may send an agent advertisement message (AAM) on the RP link 42 for the mobile unit 14. In this way, only the mobile unit 14 associated with the RP link 42 receives the AAM. The AAM includes a header, router advertisement information, a mobile advertisement extension and other extensions, as shown in FIG. 2B. The foreign agent 70 generates the AAM as a broadcast or multicast message, or other suitable type of message that may be processed by the mobile unit 14 before an IP address is assigned to the mobile unit 14, with a source address of the foreign agent 70. The foreign agent 70 provides the COA by setting the COA field in an agent advertisement extension of the AAM.

After receiving the AAM from the foreign agent 70, the mobile unit 14 may transmit a registration request message (RReqM) to the foreign agent 70 as a home link directed broadcast message. The RReqM includes a user identifier, a mobile identifier, a telephone number, or other suitable information from which a home agent 30 may identify the mobile unit 14. In particular embodiments, this information will also allow home agent 30 to authenticate the mobile unit 14.

The foreign agent 70 sends the RReqM throughout the network 22 to identify home agents 30 for the mobile unit 14. Any home agent 30 in the home network for the mobile unit 14 that receives the RReqM from the foreign agent 70 may respond by sending a registration reply message (RRepM). The RRepM includes a home agent address and a code field value indicating a rejection of the request. The foreign agent 70 receives an RRepM from the responding home agent 30, stores relevant information regarding the responding home agents 30 in the binding table 72, and sends these messages to the mobile unit 14 over the RP link 42 for the mobile unit 14.

The mobile unit 14 selects one home agent 30 and transmits an RReqM to the foreign agent 70 that indicates which home agent 30 has been selected. The foreign agent 70 updates the binding table 72 and sends the RReqM to the selected home agent 30, which assigns an IP address for the mobile unit 14. The foreign agent 70 also notifies the selected home agent 30 of the COA of the foreign agent 70 for forwarding packets to the mobile unit 14.

The selected home agent 30 sends an RRepM including the IP address for the mobile unit 14 to the foreign agent 70. The foreign agent 70 sends the RRepM to the mobile unit 14 over the RP link 42. The mobile unit 14 retrieves the IP address from the RRepM as its address for communication. At this point, the mobile unit 14 may send messages with the retrieved IP address as a source address and may process messages with the retrieved IP address as a destination address.

The selected home agent 30 notifies the network 22 with a broadcast message that any messages with the IP address of the mobile unit 14 as a destination address are to include a media access control (MAC) address for the home agent 30.

The network routers update their routing tables to include the MAC address of the home agent 30 for the IP address of the mobile unit 14. Each message for the mobile unit 14 will then comprise the MAC address of the home agent 30 and the destination IP address of the mobile unit 14. The home agent 30 intercepts each packet destined for the mobile unit 14. Based on the COA of the foreign agent 70, the home agent 30 tunnels the intercepted packets to the foreign agent 70. The foreign agent 70 extracts the original packets and delivers them to the mobile unit 14.

If the mobile unit 14 moves to a cell for a different base station corresponding to a different serving node and foreign agent, the home agent 30 updates the COA in the binding table 40 to correspond to the new foreign agent. In this way, messages for the mobile unit 14 will be tunneled to the appropriate foreign agent, which may then send the messages to the mobile unit 14. According to one embodiment, the mobile unit 14 sends an RReqM to the current foreign agent, which relays the message to the home agent 30. The home agent 30 updates entries in the binding table 40 with the new COA and sends an RRepM to the mobile unit 14 through the current foreign agent. The previous foreign agent removes the information from the binding table after the expiration of a timer.

In certain embodiments of operation, the mobile unit is responsible for managing data that is pushed to it. As used herein, a "data push" is a server initiated data transfer based on predetermined criteria, which may or may not have been specified by the mobile unit, and "pushed data" is the data sent by the server during such a transfer. Pushed data may include autonomous messages in existing sessions, e-mails, time triggered information broadcasts, location triggered information broadcasts, and/or any other server initiated data transfer based on predetermined criteria. This data is sent from the initiating server 18 to the home agent 30, which tunnels it to the serving node 24. The serving node relays the message out-of-band to the mobile unit 14 through the use of the foreign agent 70 serving the mobile unit. The foreign agent may accomplish this by placing the data into an AAM. The mobile unit 14 then determines how and whether to distribute the pushed data, either internally or to users 54. In certain embodiments, the home agent 30 or the foreign agent 70 may include an encoder for encoding the data.

Figure 2A:
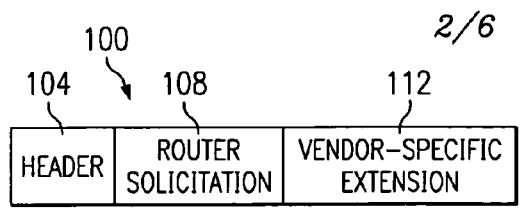
FIG. 2A illustrates a message structure for an Agent Solicitation Message (ASM) for providing out-of-band communication within the communications system of FIG. 1 in accordance with one embodiment of the present invention.

FIG. 2A illustrates a message structure for an Agent Solicitation Message (ASM) 100 for providing out-of-band communication within the system 10 in accordance with one embodiment of the present invention. ASM 100 includes a header 104, a router solicitation field 108, and a vendor-specific extension 112. In accordance with one embodiment, ASM 100 is an Internet Control Message Protocol (ICMP) router solicitation message with extensions. The ASM 100 is transmitted from mobile unit 14 to foreign agent 70 or other serving node element in order to set up sessions, to set up services within a session, to hand-off between serving nodes, to assist in service management, to assist in managing traffic during a session, and/or to perform any other suitable task. The vendor-specific extension 112 provides out-of-band communication in that the foreign agent 70 receives and processes the information in the vendor-specific extension 112 without having to process payload data in in-band messages.

Figure 2B:
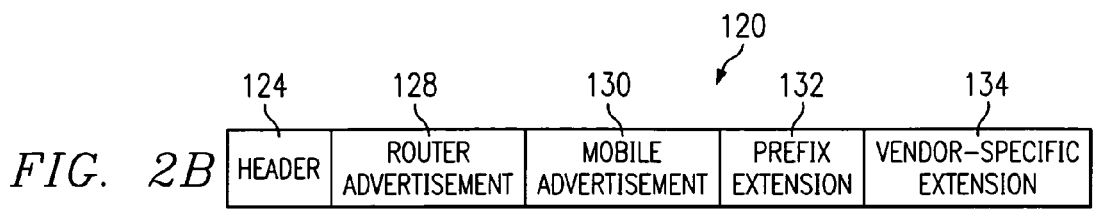
FIG. 2B illustrates a message structure for an Agent Advertisement Message (AAM) for providing out-of-band communication within the communications system of FIG. 1 in accordance with one embodiment of the present invention.

FIG. 2B illustrates a message structure for an Agent Advertisement Message (AAM) 120 for providing out-of-band communication within the system 10 in accordance with one embodiment of the present invention. The AAM 120 includes a header 124, a router advertisement field 128, a mobile advertisement field 130, a prefix length extension 132, and a vendor-specific extension 134. In accordance with one embodiment, the AAM 120 is an ICMP router advertisement message with extensions. The AAM 120 is transmitted from the foreign agent 70 or other serving node element to the mobile unit 14 in order to set up sessions, to set up services within a session, to hand-off between serving nodes, to assist in service management, to send pushed data, to assist in managing traffic during a session, and/or to perform any other suitable task. The vendor-specific extension 134 provides out-of-band communication in that the mobile unit 14 receives and processes the information in the vendor-specific extension 134 without having to process payload data in in-band messages.

Figure 2C:
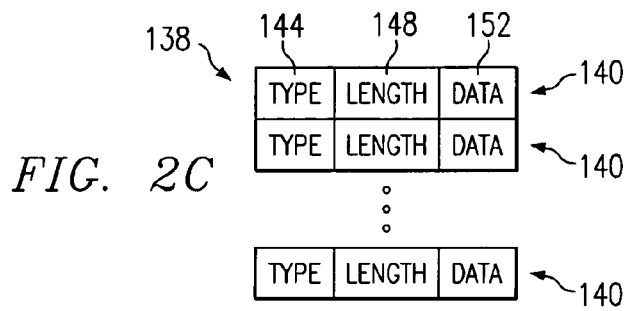
FIG. 2C illustrates a message structure for the Vendor-Specific Extensions of the ASM and the AAM of FIGS. 2A-B in accordance with one embodiment of the present invention.

FIG. 2C illustrates a message structure for a vendor-specific extension 138 in accordance with one embodiment of the present invention. The vendor-specific extension 138 may be the vendor-specific extension 112 of the ASM 100 and/or the vendor-specific extension 134 of the AAM 120. The vendor-specific extension 138 may include one or more data extensions 140.

Each data extension 140 includes a data type field 144, indicating what type of data is included in the data extension 140, a data length field 148, indicating the length of the data included in the data extension 140, and a data field 152, containing the actual data for the data extension 140. The data type field 144 may indicate "application identifier," "user data," "pushed data," or any other suitable data type known to both a service provider for the network 22 and the mobile vendors. The data length field 148 may indicate the length of the data field 152. The format and length of the data field 152 may be determined by the data type 144 and data length 148. Data extensions 140 allow variable amounts of information to be included within each discovery message.

In a particular embodiment, the data extensions 140 are used in pairs. The first data extension 140 conveys an identifier associated with the application requesting service in the data field 152, and the second data extension conveys the data associated with the service in the data field 152. The appropriate indicators for the data fields are placed in type field 144. Thus, when the serving node responds, the mobile unit will know with which application the response is associated. A variety of other combinations and/or arrangements of the data extensions exist.

Figure 3:
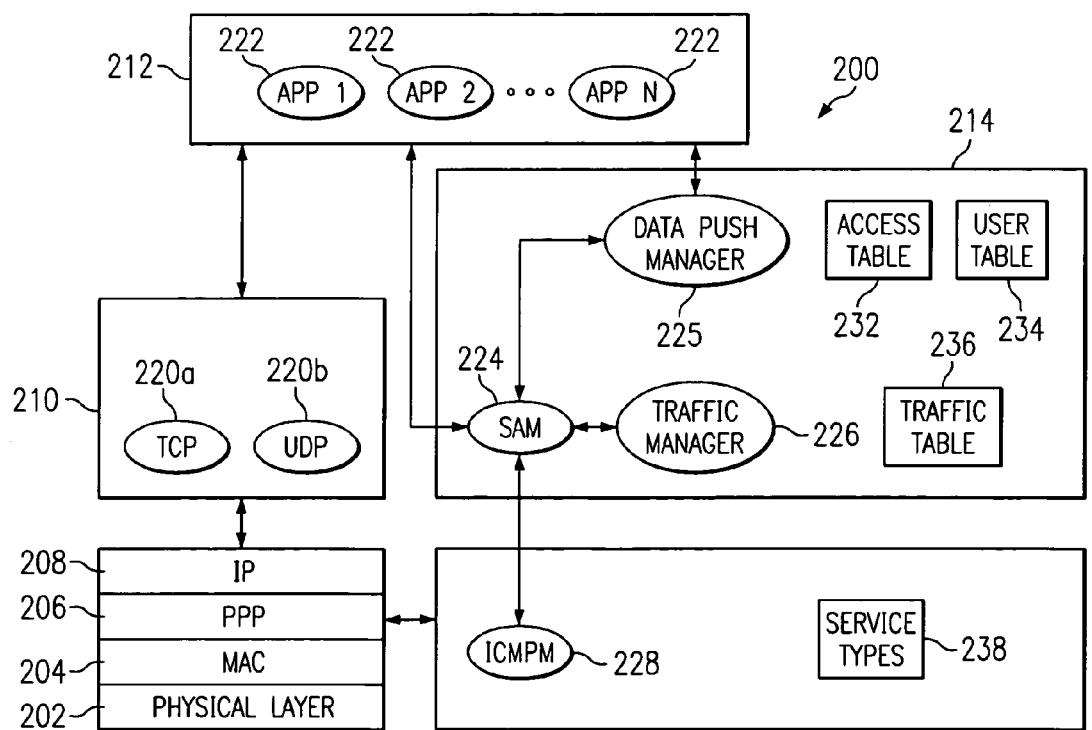
FIG. 3 is a block diagram illustrating a protocol stack for communications of a mobile unit over the wireless link of the communications system of FIG. 1 in accordance with one embodiment of the present invention.

FIG. 3 is a block diagram illustrating a protocol stack 200 for communications of a mobile unit over the wireless link 56 in accordance with one embodiment of the present invention. The protocol stack 200 is operable to authenticate mobile unit 14, establish radio frequency links to serving node 24, manage these links, and receive and manage pushed data.

The protocol stack 200 includes a physical layer 202, a MAC layer 204, a point-to-point protocol (PPP) layer 206, and an IP layer 208. The protocol stack 200 also includes a transport layer 210, an application layer 212, an access layer 214, and an ICMP layer 216.

The transport layer 210 is operable to process in-band communications, and the application layer 212 is responsible for managing the data flows within a session. The application layer 212 includes one or more applications 222, each of which may be executed in the mobile unit, either alone or concurrently with other applications 222. The applications 222 may include telephony, video, voice, web browser, or any other suitable applications. The transport layer 210 includes one or more protocols 220 for the applications 222. For example, the transport layer 210 may include a transmission control protocol 220a for packet data applications 222, a user datagram protocol 220b for packet data applications 222, or any other suitable protocol 220.

The access layer 214 includes a service access manager (SAM) 224, a data push manager 225, and a traffic manager 226. SAM 224 is operable to manage out-of-band communications for applications 222 in the mobile unit. Data push manager 225 is operable to manage the posting of pushed data to applications 222. Traffic manager 226 is operable to maintain the status of the traffic sizing and characteristics for the mobile unit and to assist SAM 224 in determining if new service requests are allowable.

The ICMP layer 216 includes an ICMP manager 228 that is operable to generate and receive out-of-band messages for the mobile unit 14. ICMP manager 228 interfaces with SAM 224 to receive messages to be sent out of band and to hand-off received out-of-band messages.

The managers 224, 225, 226 and 228, as well as other components in the system 10, comprise logic encoded in media. The logic includes functional instructions for carrying out program tasks. The media may be computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized. Additionally, functions may be distributed in a variety of manners between the managers.

As described below in connection with FIG. 4, the access layer 214 also includes a service access table 232, which stores data for the service access manager 224, such as session allowability and additional information, and the ICMP layer 216 also includes a vendor-defined service type table 238, which stores data for the ICMP manager 228, such as valid data types 144.

Access layer 214 also includes a user table 234, which stores information regarding each of users 54 and associated data, and a traffic table 236, which stores information regarding the utilization of wireless link 56. The information regarding users 54 may include the type of service of which the application is capable, such as, for example, ftp, tftp, e-mail, and/or push services, whether the application is running locally on the mobile unit or on a host subtending the mobile unit, the application user name and password, information from the network, and/or associated identifiers. The information regarding the wireless link may include the requested bandwidth, the approved bandwidth, the drop precedence, the delay budget, and/or the quality of service for each service in a session. Tables 232, 234; 236 and 238 may be any suitable data storage constructs.

Because the mobile unit 14 may execute a plurality of applications 222 simultaneously, the vendor-specific extension 112 of the ASM 100 may include a data extension 140 with an application identifier to identify the application 222 providing the data and a data extension 140 with the corresponding data from the application 222. The application identifier may be assigned by the SAM 224. In addition, the vendor-specific extension 134 of the AAM 120 may include a data extension 140 with an application identifier to identify the application 222 to receive the data and a data extension 140 with the corresponding data for the application 222. The ICMP manager 228 may compose the ASM, decompose the AAM, and provide and analyze the data types in the vendor-specific extensions based on the service type table 238. The service access manager 224 is operable to resolve incoming and outgoing messages based on the application identifier for each application 222.

In particular embodiments, applications 222, service access manager 224, data push manager 225, and ICMP manager 228 each have a variety of functions in sending and receiving information from the network. For example, when a new packet data session is initiated within a session, one of applications 222 is responsible for registering the packet data session with service access manager 224. The application then receives an ID for future service requests for the packet data session. When the packet data session attempts to access the network, the associated application 222 communicates with the service access manger to obtain approval. The request may include specifying the information to be accessed, such as a uniform resource locator (URL), and the ID for the packet data session. After receiving approval, the associated application 222 establishes the session with the network. If additional information is required of the user, the associated application 222 may post the information so that the user can enter the required additional information. Additionally, the associated application 222 provides an interface so that the service access manager 224 and data push manager 225 may post information to the packet data session.

As mentioned previously, service access manager 224 is responsible for managing out-of-band messaging from and to the packet data sessions. When a packet data session is initiated, the service access manager 224 allocates a packet data session ID. This ID allows future messages from or to the packet data session to be associated with the packet data session. Also, when a packet data session attempts to access the network, or change access in the network, such as by specifying a URL, the service access manager provides an interface to the packet data session to send the access information.

The service access manager 224 may also analyze the access information, by comparing it with the access table 232, to determine whether to allow access. If a match exists and the state indicates that the serving node has approved such a request previously, the service access manager informs the associated application that the request is approved. However, if a match exists and the state indicates that the serving node did not approve such a request previously, the service access manager informs the associated application that the request is denied. If, however, there is no match in access table 232, an information block is allocated in the table, and the service access manager constructs a vendor-specific extension and informs ICMP manager 228 of the need to send an ASM. The service access manager 224 may also construct the vendor-specific extension when desiring to send other ASMs to the serving node.

When the mobile unit receives an AAM, which might be in response to a service request or contain other information from the serving node, service access manager 224 receives the vendor-specific extension from ICMP manager 228 and parses the vendor-specific extension. The service access manager then determines what to do with the information, such as, for example, complete the service access request, inform the data push manager 225 if it contains pushed data, or update traffic table 236. Service access manager 224 may also provide statistical information, such as URL access attempts, failed attempts, and illegal accesses, update user policy information and pushed data in user table 234, and track the overall bandwidth used by different applications 222.

In general, ICMP manager 228 is responsible for sending ASMs to the serving node and receiving AAMs from the serving node. When service access manager 224 desires to send an ASM to the serving node, the ICMP manager 228 receives the vendor-specific extension from the service access manager 224 and checks the type field in the vendor-specific extension against service types table 238 to make sure that the selected service type is valid. If the type is valid, the ICMP manager 228 constructs the ASM, appending the vendor-specific extension from the service access manager 224. When the serving node sends an AAM, the ICMP manager 228 performs the initial parsing of the vendor-specific extension fields. In performing this, the ICMP manager 228 checks the type field of the vendor-specific extension against the service types table 238. If a match exists, the ICMP manager 228 sends the vendor-specific extension to the service access manager 224. The ICMP manager 228 may also log invalid message types received from the service access manager 224 and/or the serving node and may upload the log to the serving node on request.

Data push manager 225 is responsible for communicating with service access manager 224 to post pushed data to packet data sessions. When pushed data arrives at the mobile unit, the ICMP manager 228 performs the initial parsing and passes the data to service access manager 224. The service access manager 224 analyzes the vendor-specific extension to determine what type of data is present—initialization, access, traffic management, or pushed data, for example. Upon determining that the vendor-specific extension contains pushed data, the service access manager notifies the data push manager 225.

The data push manager 225 communicates with the service access manager 224 to determine whether the pushed data is appropriate for posting to one or more packet data sessions. Pushed data may be appropriate for a packet data session if it meets defined criteria and/or it is destined for the packet data session. In evaluating whether the pushed data meets defined criteria, data push manager 225 may consult user table 234 to determine whether a user has defined any preferences and/or filters for pushed data. For example, a user may specify in user table 234 whether or not data regarding stock quotes should be pushed to a packet data session, whether or not data regarding local restaurants should be pushed to a packet data session, or any other appropriate specification. Pushed data may be destined for a particular data session if one of servers 18, home agent 30, serving node 24, or any other appropriate device in system 10 inserts an indicator, such as, for example, an address, in or with the pushed data indicating that it is destined for a particular packet data session. If the pushed data is appropriate for a session, data push manager 225 posts the pushed data to the session.

Data push manager 225 may also determine whether the data is static or dynamic. Static data is typically not dependent upon time, geographic location, or other appropriate factor for its applicability to packet data sessions. Dynamic data, on the other hand, typically is dependent upon time, geographic location, or other appropriate factor for its applicability to packet data sessions. Data push manager 225 may determine whether pushed data is static or dynamic by examining an indicator in or with the pushed data and/or examining the pushed data itself.

If the data is static, data push manager 225 instructs service access manager 224 to store the data in user table 234. If, however, the data is dynamic, data push manager 225 may perform further processing to determine whether the data should be stored. Data push manager 225 may accomplish this by determining whether an indicator in or with the pushed data indicates that it should be stored and/or determining whether the dynamic data has a possibility of future applicability to a packet data session. Dynamic data may have such applicability if, for example, its time, geographic, and/or other sensitivity is not exhausted and/or it is not destined for a specific packet data session.

If dynamic data is stored, data push manger 225 has the responsibility for determining if an event occurs that would trigger posting of the data, such as, for example, the expiration of a timer or entrance into a geographic region. Additionally, data push manager 225 is responsible for determining, upon the initiation of a new packet data session, whether any static data is appropriate for the new session. If such data exists, the data push manager 225 posts the data to the new session.

In some embodiments, it is also possible that the serving node will store some static data. Thus, when the serving node receives an ASM indicating that a new packet data session is being initiated and the serving node checks the user policy base to match the condition and actions, if the action indicates that some static data needs to be pushed to the session, the serving node triggers an AAM carrying the additional data to the session. When the AAM is received, the service access manager 224 parses the vendor-specific extension and detects that the serving node has sent static data for one of the packet data sessions. The data may then be stored in the user table 234 and posted to the session, possibly in an additional window. Accordingly, instead of the serving node itself providing static data as sent by the servers, the mobile node itself can detect this data and post it to the session.

Figure 4A:
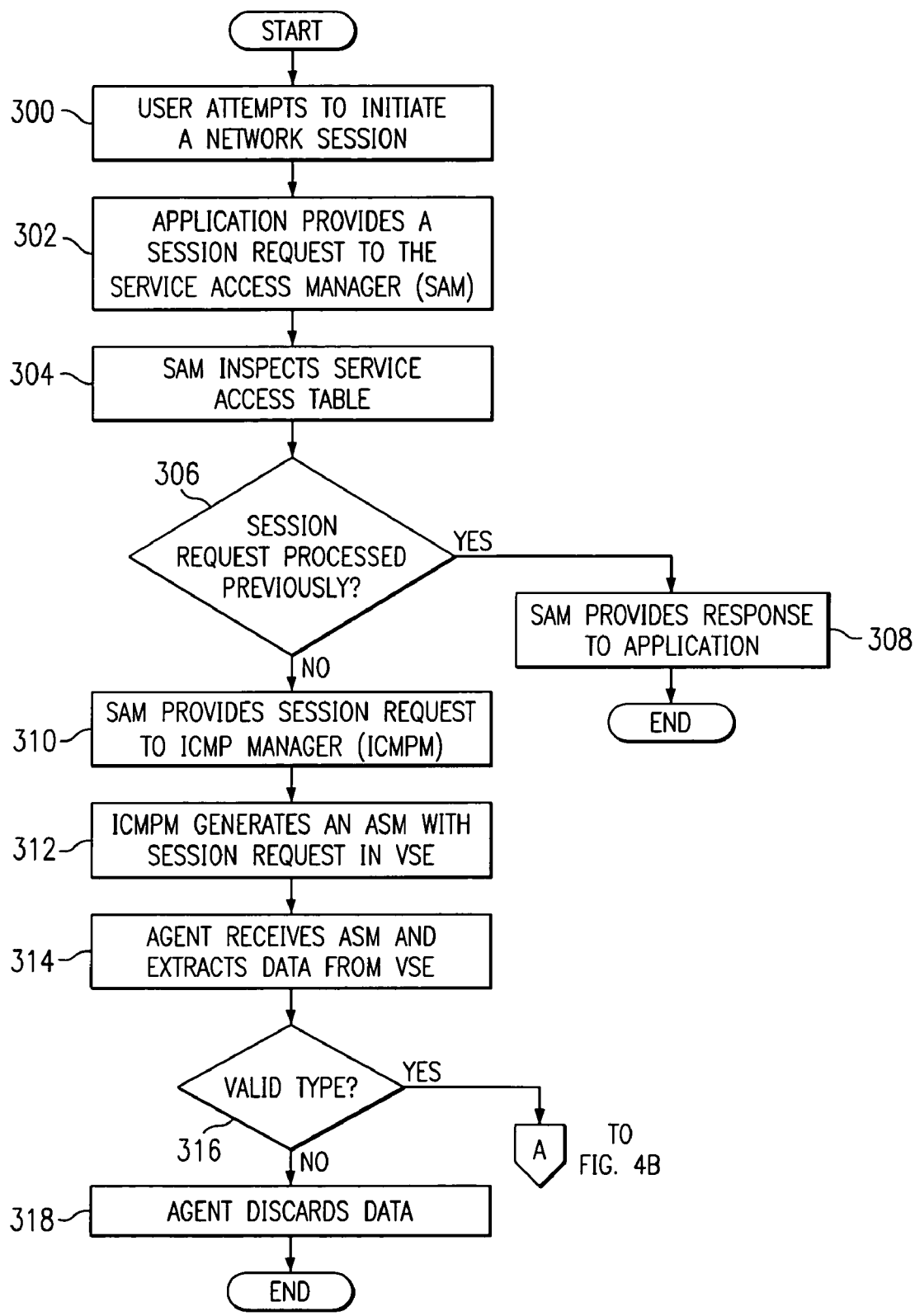
FIGS. 4A-C are a flow diagram illustrating a method for establishing a session for a mobile unit in accordance with one embodiment of the present invention.
Figure 4B:
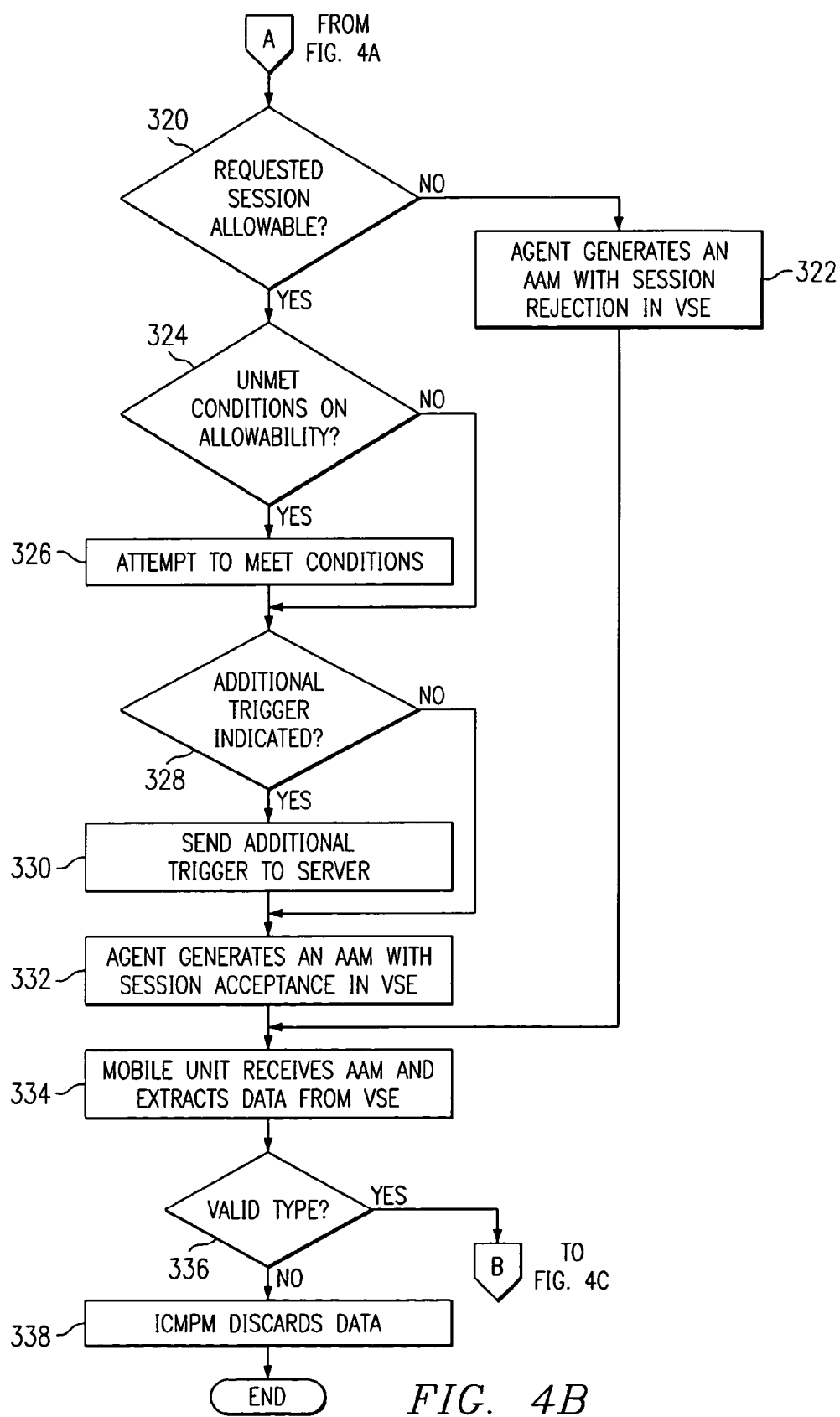
Figure 4C:
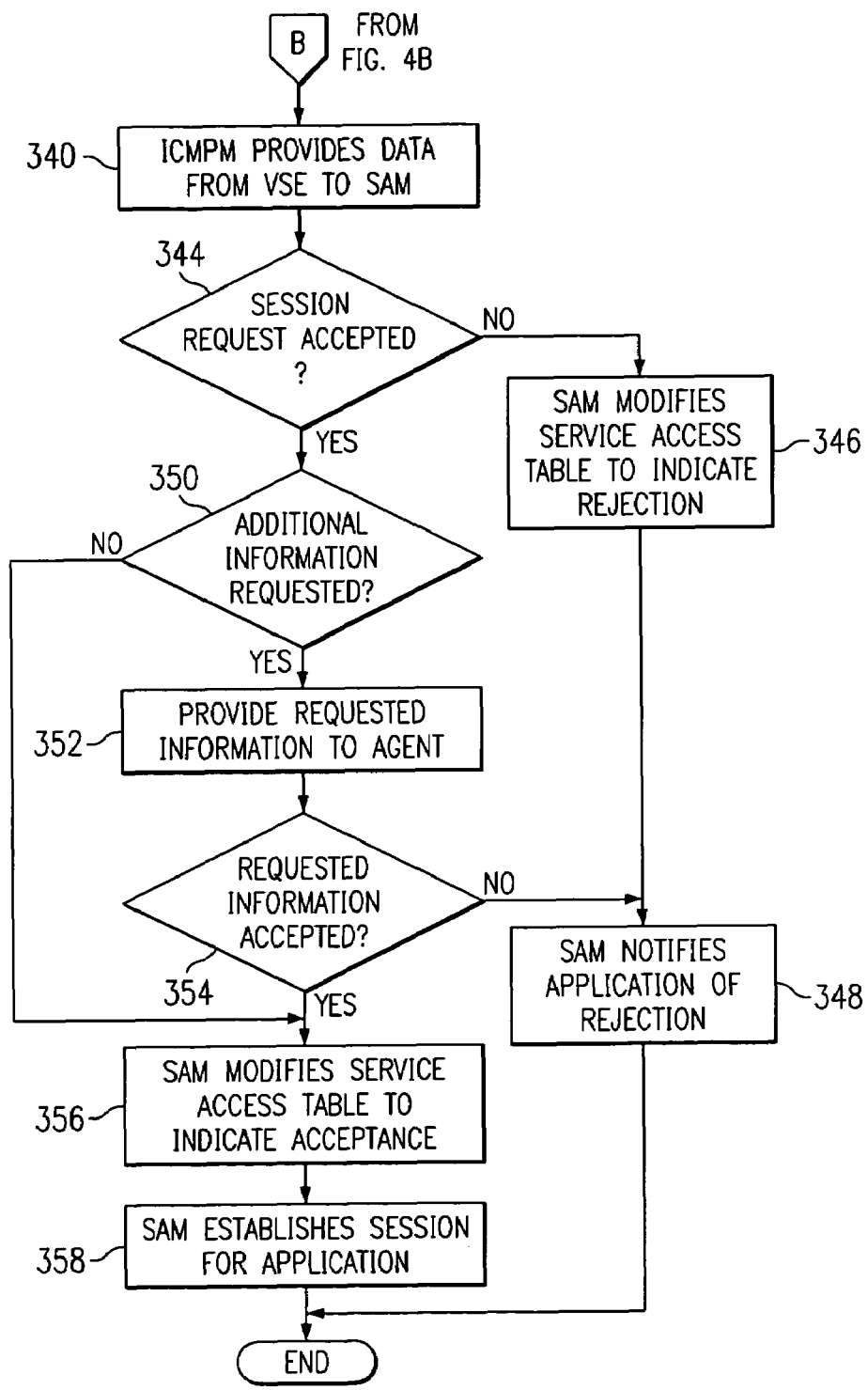

FIG. 4 is a flow diagram illustrating a method for establishing a session for a mobile unit in accordance with one embodiment of the present invention. The method begins at step 300 where one of users 54 attempts to initiate a network session for one of applications 222 over an existing connection. At step 302, the application 222 provides a session request to the service access manager (SAM) 224. According to one embodiment, the session request includes an application identifier for the application 222 and session data, such as a URL for a web-site which the user 54 is attempting to access.

At step 304, the SAM 224 inspects the service access table 232, which tracks previously accepted and rejected session initiation attempts for each application 222. At decisional step 306, the SAM 224 determines whether the session request was processed previously based on the data in the service access table 232. This determination may include, for example, matching a requested URL to a URL stored in the service access table 232 in association with the requesting application 222. If the session request was processed previously, the method follows the Yes branch from decisional step 306 to step 308.

At step 308, the SAM 224 provides the response indicated in the service access table to the application 222. Thus, if the request was previously accepted by the serving node 24, the SAM 224 provides an "accepted" response to the application 222, while if the request was previously rejected by the serving node 24, the SAM 224 provides a "rejection" response to the application 222. At this point, the method comes to an end. Thus, using the service access table 232, the SAM 224 in the mobile unit 14 may handle previously processed session requests without utilizing communication resources or serving node resources and without accessing external resources. As used herein, therefore, without accessing external resources means without accessing external resources at the time the SAM 224 is processing the previously processed request, as opposed to at the time the SAM 224 initially processes a request and obtains the response for storage in the service access table 232.

Returning to decisional step 306, if the session request was not processed previously, the method follows the No branch from decisional step 306 to step 310. At step 310, the SAM 224 provides the session request to the ICMP manager (ICMPM) 228. At step 312, the ICMPM 228 generates an ASM 100 with the session request in the vendor-specific extension 112 and transmits the ASM 100 to the foreign agent 70.

At step 314, the foreign agent 70 receives the ASM 100 from the mobile unit 14 and extracts data from the vendor-specific extension 112. At decisional step 316, the foreign agent 70 determines whether the data types 144 for the data extensions 140 in the vendor-specific extension 112 are valid based on a comparison to data types 144 in the service type table 238. If the data types 144 are not valid, the method follows the No branch from decisional step 316 to step 318.

At step 318, the foreign agent 70 discards the data from the vendor-specific extension 112, and the method comes to an end. In this situation, the expiration of a timer at the mobile unit 14 may indicate to the mobile unit 14 that the foreign agent 70 has not responded in a timely manner. The mobile unit 14 may then attempt to re-send the ASM 100.

Returning to decisional step 316, if the data types 144 are valid, the method follows the Yes branch from decisional step 316 to decisional step 320. At decisional step 320, the foreign agent 70 determines whether the requested session is allowable based on the service level agreement for the user 54 provided to the serving node 24 by the core 62. If the requested session is not allowable, the method follows the No branch from decisional step 320 to step 322. At step 322, the foreign agent 70 generates an AAM 120 with a session rejection in the vendor-specific extension 134 and transmits the AAM 120 to the mobile unit 14. The method then continues to step 334.

Returning to decisional step 320, if the requested session is allowable, the method follows the Yes branch from decisional step 320 to decisional step 324. At decisional step 324, the foreign agent 70 determines whether any unmet conditions on the allowability of the session exist, such as user authentication, receipt of billing information, bandwidth availability, and the like. Accordingly, a session request may be allowed, rejected or conditionally allowed. If there are unmet conditions on the allowability of the session, the method follows the Yes branch from decisional step 324 to step 326. At step 326, the foreign agent 70 attempts to meet the conditions without user input, if possible. For example, if a user 54 may be authenticated based on data in the core 62 for that user 54, the foreign agent 70 may meet an authentication condition without user input. The method then continues to step 328.

Returning to decisional step 324, if there are no unmet conditions on the allowability of the session, the method follows the No branch from decisional step 324 to step 328. At step 328, the foreign agent determines whether any additional triggers are indicated by the session request. Additional triggers may comprise informing one of servers 18 of the session request or other suitable triggers. If an additional trigger is indicated, the method follows the Yes branch from decisional step 328 to step 330. At step 330, the foreign agent 70 sends an additional trigger to one or more servers 18 through the network 22 in accordance with the indicated additional triggers. The method then continues to step 332.

Returning to decisional step 328, if an additional trigger is not indicated, the method follows the No branch from decisional step 328 to step 332. At step 332, the foreign agent 70 generates an AAM 120 with a session acceptance in the vendor-specific extension 134 and transmits the AAM 120 to the mobile unit 14. At step 334, the mobile unit 14 receives the AAM 120 generated in either step 322 or step 332 and extracts the data from the vendor-specific extension 134.

At decisional step 336, the ICMPM 228 determines whether the data types 144 for the data extensions 140 in the vendor-specific extension 134 are valid based on a comparison to data types 144 in the service type table 238. If the data types 144 are not valid, the method follows the No branch from decisional step 336 to step 338. At step 338, the ICMPM 228 discards the data from the vendor-specific extension 134, and the method comes to an end. In this situation, the expiration of a timer at the foreign agent 70 may indicate to the foreign agent 70 that the mobile unit 14 has not responded in a timely manner. The foreign agent 70 may then attempt to re-send the AAM 120.

Returning to decisional step 336, if the data types 144 are valid, the method follows the Yes branch from decisional step 336 to step 340. At step 340, the ICMPM 228 provides the data from the vendor-specific extension 134 to the SAM 224. At decisional step 344, the SAM 224 determines whether the session request was accepted by the foreign agent 70. If the session request was not accepted, the method follows the No branch from decisional step 344 to step 346. At step 346, the SAM 224 modifies the service access table 232 to indicate that the session request was rejected. At step 348, the SAM 224 notifies the application 222 that the session request was rejected, at which point the method comes to an end.

Returning to decisional step 344, if the session request was accepted, the method follows the Yes branch from decisional step 344 to decisional step 350. At decisional step 350, the SAM 224 determines whether additional information was requested by the foreign agent 70. For example, if an unmet condition on allowability was found to exist in step 324 that could not be met without user input in step 326, additional information may be requested through the vendor-specific extension 134 of the AAM 120. If additional information was requested, the method follows the Yes branch from decisional step 350 to step 352.

At step 352, the additional information received from the user 54 is provided to the foreign agent 70. At decisional step 354, the foreign agent 70 determines whether the additional information is acceptable. If the additional information is unacceptable, the method follows the No branch from decisional step 354 and returns to step 348, where the SAM 224 notifies the application 222 that the session request was rejected.

Returning to decisional step 354, if the additional information is acceptable, the method follows the Yes branch from decisional step 354 to step 356. Also, returning to decisional step 350, if additional information was not requested, the method follows the No branch from decisional step 350 to step 356. At step 356, the SAM 224 modifies the service access table 232 to indicate that the session request was accepted. At step 358, the SAM 224 establishes the requested session for the application 222, at which point the method comes to an end.

In this way, out-of-band communication is provided between the mobile unit 14 and the foreign agent 70 of the serving node 24. In addition, previously accepted or rejected session requests are tracked in the mobile unit 14 through the service access table 232 such that the serving node 24 is not required to re-verify a session request that has been processed previously. Thus, the foreign agent 70 may accept or reject session requests without checking the contents of the payload data for each message sent from the mobile unit 14. Accordingly, the burden on the resources of the serving node 24 is greatly reduced, freeing those resources to accomplish other tasks.

Figure 5:
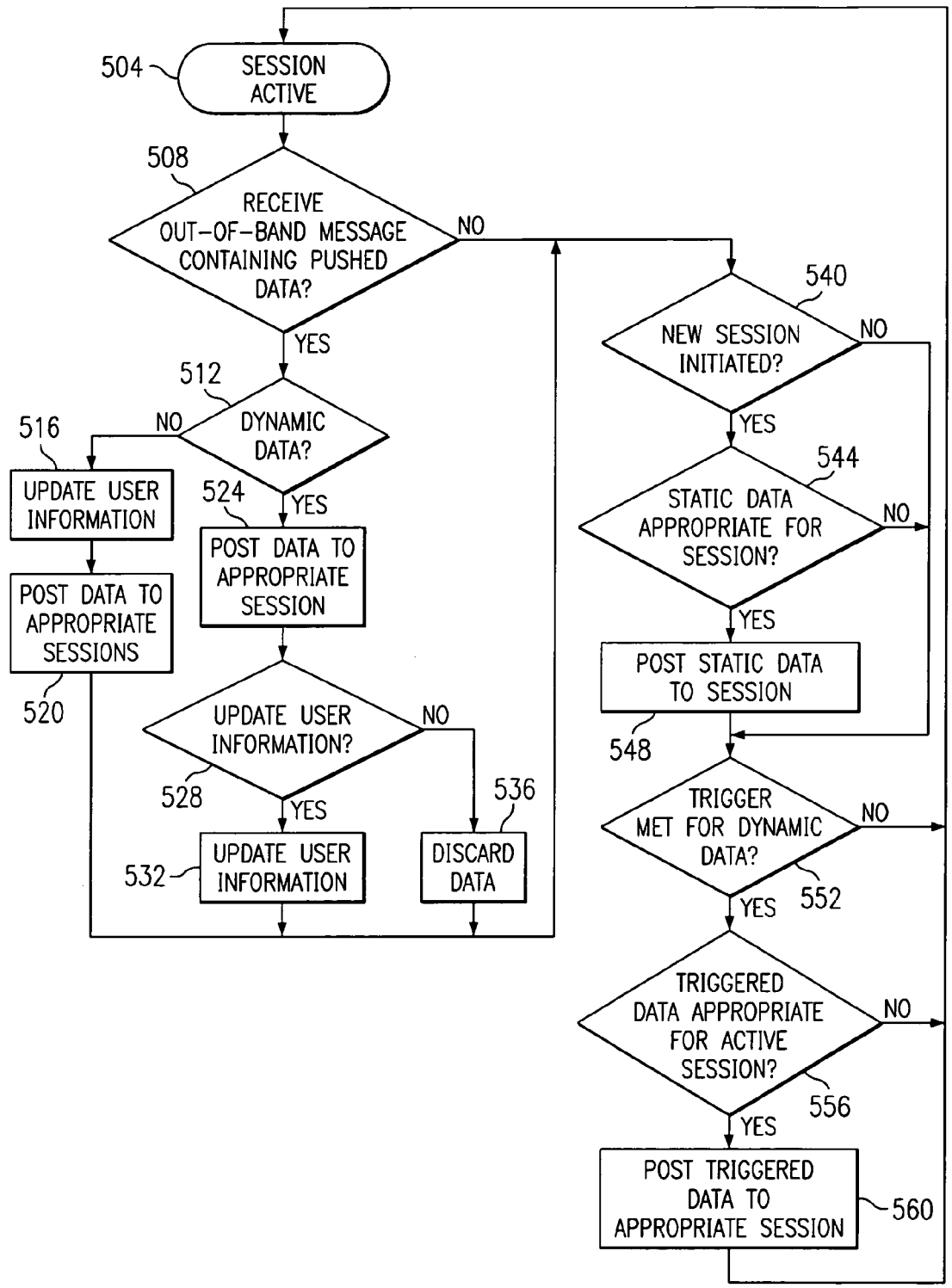
FIG. 5 is a flow diagram illustrating a method for managing pushed data at a mobile unit.

FIG. 5 is a flow diagram 500 illustrating one embodiment of a method for managing pushed data at a mobile unit. The process begins at state block 504 where the mobile unit has already established a session with a serving node. The session may have been established as discussed previously. At decision block 508, the mobile unit determines whether it has received an out-of-band message containing pushed data. A service access manager may accomplish this, for example, by examining identifiers in the vendor-specific extension of an AAM. If the mobile unit determines that it has received pushed data, the mobile unit analyzes the pushed data to determine whether it is dynamic or static at decision block 512. A data push manager may accomplish this, for example, by examining an indicator in or with the pushed data and/or determining whether the data is dependent on time, location, and/or other appropriate factor. If the data is static, the mobile unit updates user information at function block 516 and posts the data to appropriate sessions, if any, at function block 520. The mobile unit may post the data to the packet data session by, for example, establishing a transient transport path. The process then continues at decision block 540.

If, however, the mobile unit determines that the data is dynamic, the mobile unit posts the data to an appropriate session, if any, at function block 524. The mobile unit then determines whether the user information needs to be updated with the dynamic data at decision block 528. Dynamic data may need to be stored if an indicator in or with the data indicates that it should be stored and/or the data itself indicates that it has a possibility of future applicability to a packet data session, such as, for example, a mobile unit moving within a certain geographic region or a time period expiring. If the user information does need to be updated with the dynamic data, the mobile unit accomplishes this at function block 532. If, however, the user information does not need to be updated with the dynamic data, the mobile unit discards the data at function block 536. The process then continues at decision block 540

At decision block 540, the mobile unit determines whether a new packet data session is being initiated. If a new session is being initiated, the mobile unit determines whether any of the static data is appropriate for the new session at decision block 544. If there is no static data appropriate for the new session, the process proceeds to decision block 552. If, however, any of the static data is appropriate for the new session, the mobile unit posts the data to the session at function block 548, and the process again proceeds to decision block 552.

At decision block 552, the mobile unit determines whether a trigger has occurred for any of the stored dynamic data. The triggers may be based on time, location, and/or any other appropriate factor. If a trigger has not occurred, the mobile unit returns to its functions in state block 504. If, however, a trigger has occurred for some of the dynamic data, the mobile unit determines whether the dynamic data is appropriate for any of the currently active sessions at decision block 556. If the triggered dynamic data is not appropriate for any of the currently active sessions, the mobile unit returns to its functions at state block 504. If, however, the triggered dynamic data is appropriate for one or more of the currently active sessions, the mobile unit posts the data to the appropriate sessions at function block 560 and again returns to its functions at state block 504.

Although flow diagram 500 illustrates a variety of operations for managing pushed data at a mobile unit, other embodiments of the present invention may contain more, less, and/or different arrangements of operations. For example, in certain embodiments, the mobile unit may not store dynamic data. As another example, in some embodiments, the mobile unit may determine whether it is making multiple postings of the same pushed data to the same user and, accordingly, only make one posting to the user. As a further example, in particular embodiments, the mobile unit may negotiate with the serving node for additional bandwidth for pushed data services using the out-of-band messaging. As still a further example, if the user decides to take an action in response to pushed data, the response may be communicated out-of-band, in a vendor-specific extension of an ASM, for example, to the foreign agent, which subsequently sends the response to the server that initially requested the data be pushed to the mobile unit.

The present invention provide several technical features. For example, in some embodiments, the invention reduces the messaging required to locate a mobile unit. Accordingly, the burden on system wide logical resources and messaging between numerous network elements is reduced. As another example, in certain embodiments, because the serving node does not have to monitor all of the incoming traffic for pushed data since it is sent out-of-band, processing at the serving node is reduced. Also, by using out-of-band signaling to establish characteristics for the flows, the invention allows the mobile node to assign separate traffic characteristics and analyze the resulting impact on existing traffic flows.

Although the present invention has been described with several embodiments, various changes and modifications may be suggested to one skilled in the art. It is intended that the appended claims encompass such changes and modifications.

What is claimed is:

1. A method for managing pushed data at a mobile unit, the method comprising:
   receiving an out-of-band message at a mobile unit hosting a session, the message comprising pushed data and an indicator, the pushed data reflecting that a server initiated a data transfer that is based on predetermined criteria, the indicator indicating whether the pushed data is destined for the session; and
   filtering data to post only selected data to the session by:
      determining, from the indicator, whether the data is appropriate for the session currently being hosted by the mobile unit;
      posting the data to the session if the data is appropriate for the session; and
      discarding the data if the data is not appropriate for the session.

2. The method of claim 1, further comprising:
   analyzing the data to determine if it is static or dynamic; and
   storing the data if it is static.

3. The method of claim 2, wherein analyzing the data comprises determining whether an indicator in the data indicates that the data is dynamic.

4. The method of claim 2, further comprising:
   determining, if the data is dynamic, whether to store the data; and
   storing the dynamic data if it should be stored.

5. The method of claim 4, wherein determining whether to store the data comprises determining whether an indicator in the data indicates that the data should be stored.

6. The method of claim 4, further comprising:
   determining whether a trigger has been met for stored dynamic data;
   determining, if a trigger has been met, whether the data is appropriate for a session currently being hosted by the mobile unit; and
   posting the data to the session if the data is appropriate.

7. The method of claim 2, further comprising:
   detecting the initiation of a session;
   determining whether stored static data is appropriate for the session being initiated; and
   posting the stored data to the session being initiated if the stored data is appropriate.

8. The method of claim 1, wherein the data is received out-of-band in a vendor-specific extension of an agent advertisement message.

9. A system for managing pushed data at a mobile unit, comprising:
a computer-processable medium; and
logic stored on the computer-processable medium, the logic operable to:
receive an out-of-band message at a mobile unit hosting a session, the message comprising pushed data and an indicator, the pushed data reflecting that a server initiated data transfer that is based on predetermined criteria, the indicator indicating whether the pushed data is destined for the session; and
filter data to post only selected data to the session by:
determining, from the indicator, whether the data is appropriate for the session currently being hosted by the mobile unit;
posting the data to the session if the data is appropriate for the session; and
discarding the data if the data is not appropriate for the session.

10. The system of claim 9, wherein the logic is further operable to:
analyze the data to determine if it is static or dynamic; and
initiate storing the data if it is static.

11. The system of claim 10, wherein analyzing the data comprises determining whether an indicator in the data indicates that the data is dynamic.

12. The system of claim 10, wherein the logic is further operable to:
determine, if the data is dynamic, whether to store the data; and
initiate storing the dynamic data if it should be stored.

13. The system of claim 12, wherein determining whether to store the data comprises determining whether an indicator in the data indicates that the data should be stored.

14. The system of claim 12, wherein the logic is further operable to:
determine whether a trigger has been met for stored dynamic data;
determine, if a trigger has been met, whether the data is appropriate for a session currently being hosted by the mobile unit; and
post the data to the session if the data is appropriate.

15. The system of claim 10, wherein the logic is further operable to:
detect the initiation of a session;
determine whether the stored static data is appropriate for the session being initiated; and
post the stored data to the session being initiated if the stored data is appropriate.

16. The system of claim 9, wherein the data is received out-of-band in a vendor-specific extension of an agent advertisement message.

17. A system for managing pushed data at a mobile unit, comprising:
means for receiving an out-of-band message at a mobile unit hosting a session, the message comprising pushed data and an indicator, the pushed data reflecting that a server initiated data transfer that is based on predetermined criteria, the indicator indicating whether the pushed data is destined for the session; and
means for filtering data to post only selected data to the session by:
determining, from the indicator, whether the data is appropriate for the session currently being hosted by the mobile unit;
posting the data to the session if the data is appropriate for the session; and
discarding the data if the data is not appropriate for the session.

18. The system of claim 17, further comprising:
means for analyzing the data to determine if it is static or dynamic; and
means for storing the data if it is static.

19. The system of claim 18, wherein analyzing the data comprises determining whether an indicator in the data indicates that the data is dynamic.

20. The system of claim 18, further comprising:
means for determining, if the data is dynamic, whether to store the data; and
means for storing the data if it should be stored.

21. The system of claim 20, wherein determining whether to store the data comprises determining whether an indicator in the data indicates that the data should be stored.

22. The system of claim 20, further comprising:
means for determining whether a trigger has been met for stored dynamic data;
means for determining, if a trigger has been met, whether the data is appropriate for a session currently being hosted by the mobile unit; and
means for posting the data to the session if the data is appropriate.

23. The system of claim 18, further comprising:
means for detecting the initiation of a session;
means for determining whether stored static data is appropriate for the session being initiated; and
means for posting the stored data to the session being initiated if the stored data is appropriate.

24. The system of claim 17, wherein the data is received out-of-band in a vendor-specific extension of an agent advertisement message.

25. A system for managing pushed data at a mobile unit, comprising:
a service access manager operable to receive an out-of-band message at a mobile unit hosting a session, the message comprising pushed data and an indicator, the pushed data reflecting that a server initiated data transfer that is based on predetermined criteria, the indicator indicating whether the pushed data is destined for the session; and
a data push manager operable to:
filter data to post only selected data to the session by:
determining, from the indicator, whether the data is appropriate for the session currently being hosted by the mobile unit;
posting the data to the session if the data is appropriate for the session; and
discarding the data if the data is not appropriate for the session.

26. The system of claim 25, wherein the data push manager is further operable to analyze the data to determine if it is static or dynamic and to initiate storing the data if it is static.

27. The system of claim 26, wherein analyzing the data comprises determining whether an indicator in the data indicates that the data is dynamic.

28. The system of claim 26, wherein the data push manager is further operable to determine, if the data is dynamic, whether to store the data and to initiate storing of the dynamic data if it should be stored.

29. The system of claim 28, wherein determining whether to store the data comprises determining whether an indicator in the data indicates that the data should be stored.

30. The system of claim 28, wherein the data push manger is further operable to:
- determine whether a trigger has been met for stored dynamic data;
- determine, if a trigger has been met, whether the data is appropriate for a session currently being hosted by the mobile unit; and
- post the data to the session if the data is appropriate.

31. The system of claim 26, wherein the data push manger is further operable to:
- detect the initiation of a session;
- determine whether stored static data is appropriate for the session being initiated; and
- post the stored data to the session being initiated if the stored data is appropriate.

32. The system of claim 25, wherein the data received out-of-band in the vendor-specific extension of an agent advertisement message.

33. A system for managing pushed data at a mobile unit, comprising:
- a service access manager operable to:
  - receive an out-of-band message at a mobile unit hosting a session,
  - the message comprising pushed data and an indicator, the pushed data reflecting that a server initiated data transfer that is based on predetermined criteria, the indicator indicating whether the pushed data is destined for the session; and
- a data push manager operable to:
  - filter data to post only selected data to the session, the filtering comprising:
    - determine, from the indicator, whether the data is appropriate for the session currently being hosted by the mobile unit,
    - post the data to the session if the data is appropriate for the session,
    - discard the data if the data is not appropriate for the session,
    - analyze the data to determine if it is static or dynamic,
    - initiate storing the data if it is static,
    - determine, if the data is dynamic, whether to store the data,
    - initiate storing the dynamic data if it should be stored,
    - detect the initiation of a session,
    - determine whether stored static data is appropriate for the session being initiated,
    - post the stored static data to the session being initiated if the stored data is appropriate,
    - determine whether a trigger has been met for stored dynamic data,
    - determine, if a trigger has been met, whether the dynamic data is appropriate for a session currently being hosted by the mobile unit, and
    - post the dynamic data to the session if the data is appropriate.

\* \* \* \* \*